United States Patent
Murphy et al.

(10) Patent No.: US 6,850,825 B2
(45) Date of Patent: Feb. 1, 2005

(54) METHOD FOR SUPPRESSING DEPLOYMENT OF AN INFLATABLE RESTRAINT BASED ON SENSED OCCUPANT WEIGHT

(75) Inventors: Morgan D. Murphy, Kokomo, IN (US); Phillip E Kaltenbacher II, Kokomo, IN (US); Royce L. Rennaker, Converse, IN (US); Brett A. Hall, Kokomo, IN (US); Stuart S. Sullivan, Peru, IN (US); Peter J. Schubert, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 95 days.

(21) Appl. No.: 10/061,786

(22) Filed: Feb. 4, 2002

(65) Prior Publication Data

US 2003/0149517 A1 Aug. 7, 2003

(51) Int. Cl.[7] .......................... B60R 22/00; E05F 15/00; G05D 1/00
(52) U.S. Cl. ........................ 701/45; 701/46; 701/47; 701/48; 180/273; 180/281; 180/282; 280/734; 280/735
(58) Field of Search .................. 701/45, 46, 47, 701/48; 180/273, 281, 282; 280/734, 735

(56) References Cited

U.S. PATENT DOCUMENTS

| 5,999,871 | A | 12/1999 | Liu .............................. 701/45 |
|---|---|---|---|
| 6,213,502 | B1 | 4/2001 | Ryan et al. .................. 280/736 |
| 6,219,606 | B1 | 4/2001 | Wessels et al. ............... 701/45 |
| 6,236,308 | B1 | 5/2001 | Dalum ......................... 380/436 |
| 6,242,701 | B1 * | 6/2001 | Breed et al. ................. 177/144 |
| 6,364,352 | B1 * | 4/2002 | Norton ........................ 280/735 |
| 6,390,501 | B1 | 5/2002 | Greib et al. ............. 280/743.2 |
| 6,430,489 | B1 | 8/2002 | Dalum ......................... 701/45 |
| 6,439,603 | B2 | 8/2002 | Damman et al. ........... 280/736 |
| 6,442,597 | B1 | 8/2002 | Deshpande et al. ......... 709/214 |
| 6,542,802 | B2 * | 4/2003 | Gray et al. ................... 701/45 |
| 6,553,294 | B1 | 4/2003 | Caruso et al. ................ 701/45 |
| 2002/0043789 | A1 * | 4/2002 | Lichtinger et al. .......... 280/735 |
| 2003/0004628 | A1 * | 1/2003 | Rennaker et al. ............. 701/45 |
| 2003/0040858 | A1 * | 2/2003 | Wallace ........................ 701/45 |
| 2003/0060957 | A1 * | 3/2003 | Okamura et al. ............. 701/45 |
| 2003/0071444 | A1 * | 4/2003 | Knox .......................... 280/735 |
| 2003/0085557 | A1 * | 5/2003 | Winkler et al. ............. 280/735 |

* cited by examiner

*Primary Examiner*—Thomas G. Black
*Assistant Examiner*—Brian J. Broadhead
(74) *Attorney, Agent, or Firm*—Stefan V. Chmielewski

(57) ABSTRACT

An improved method of selectively suppressing deployment of a vehicular inflatable restraint utilizes dynamic variation in the apparent weight of a vehicle occupant to infer a free mass of the seat occupant. The free mass of the occupant is inferred by filtering out portions of a weight-responsive signal due to occupant position adjustment and inferring the occupant free mass based on the variation of the apparent weight with respect to the variation in vertical acceleration of the vehicle. The decision to allow or suppress deployment of the restraint is determined based on a comparison of the static weight reading with at least one threshold, and the occupant free mass is used to adjust the threshold in a direction to minimize the overall variability of the system. Measures of the seat belt tension and the seat temperature are also be used to adjust the threshold in a direction to minimize system variability.

4 Claims, 4 Drawing Sheets

METHOD FOR SUPPRESSING DEPLOYMENT OF AN INFLATABLE RESTRAINT BASED ON SENSED OCCUPANT WEIGHT

TECHNICAL FIELD

This invention relates to a method of allowing or suppressing deployment of an inflatable restraint based on sensed occupant weight, and more particularly to a method of taking into account both static and dynamic weight data.

BACKGROUND OF THE INVENTION

Vehicle occupant weight sensing systems are useful in connection with air bags and other pyrotechnically deployed restraints as a means of characterizing the occupant for purposes of determining whether to allow or suppress deployment of the restraints. For example, it is generally desired to allow deployment for an adult, and to suppress deployment (or reduce deployment force) for a child. However, it has been found that a child occupant can produce a static weight reading similar to that of a small ($5^{th}$ percentile) female adult due to variations seat belt tension and the orientation of the occupant on the seat, for example. In other words, the static weight readings for a child occupant and a small adult occupant statistically vary over first and second ranges due to system variability, and there can be some amount of overlap between the first and second ranges under certain conditions. Fortunately, the range of variability is substantially reduced in the case of dynamic weight readings (i.e., the variation of the weight reading), and the dynamic variation has been used to more reliably characterize the seat occupant for purposes of determining whether to allow or suppress restraint deployment. For example, in the U.S. Pat. No. 6,246,936 to Murphy et al., issued on Jun. 12, 2001, and assigned to the assignee of the present invention, the dynamic variation is used to distinguish a tightly cinched child seat from an adult; and in the U.S. patent application Ser. No. 09/895,742, filed on Jul. 2, 2001, and assigned to the assignee of the present invention, the dynamic variation is normalized with respect to acceleration of the vehicle to compensate for the effects of operating the vehicle on a rough road surface.

SUMMARY OF THE INVENTION

The present invention is directed to an improved method of selectively suppressing deployment of a vehicular inflatable restraint in which both static and dynamic variation in the apparent weight of a vehicle occupant are used in a complementary manner that reduces overall system variability. The free mass of the seat occupant is estimated based on the variation of the sensed weight with respect to the variation in vertical acceleration of the vehicle, ignoring signal variations due to occupant position adjustment. The decision to allow or suppress deployment of the restraint is determined based on a comparison of the static weight reading with at least one threshold, and the occupant free mass is used to adjust the threshold in a direction to minimize the overall variability of the system. In the preferred embodiment, measures of the seat belt tension and the seat temperature are also be used to adjust the threshold in a direction to minimize system variability.

DESCRIPTION OF THE PREFERRED EMBODIMENT

The present invention is disclosed in the context of a restraint system for an occupant of a vehicle passenger seat 10, where the occupant weight is sensed based on the fluid pressure in a seat cushion bladder 12. In general, however, the present invention also applies to other types of occupant weight sensing systems, such as systems that sense the strain in a seat frame element, or systems that include a network of pressure sensitive cells distributed over the seating area.

Figure 1:
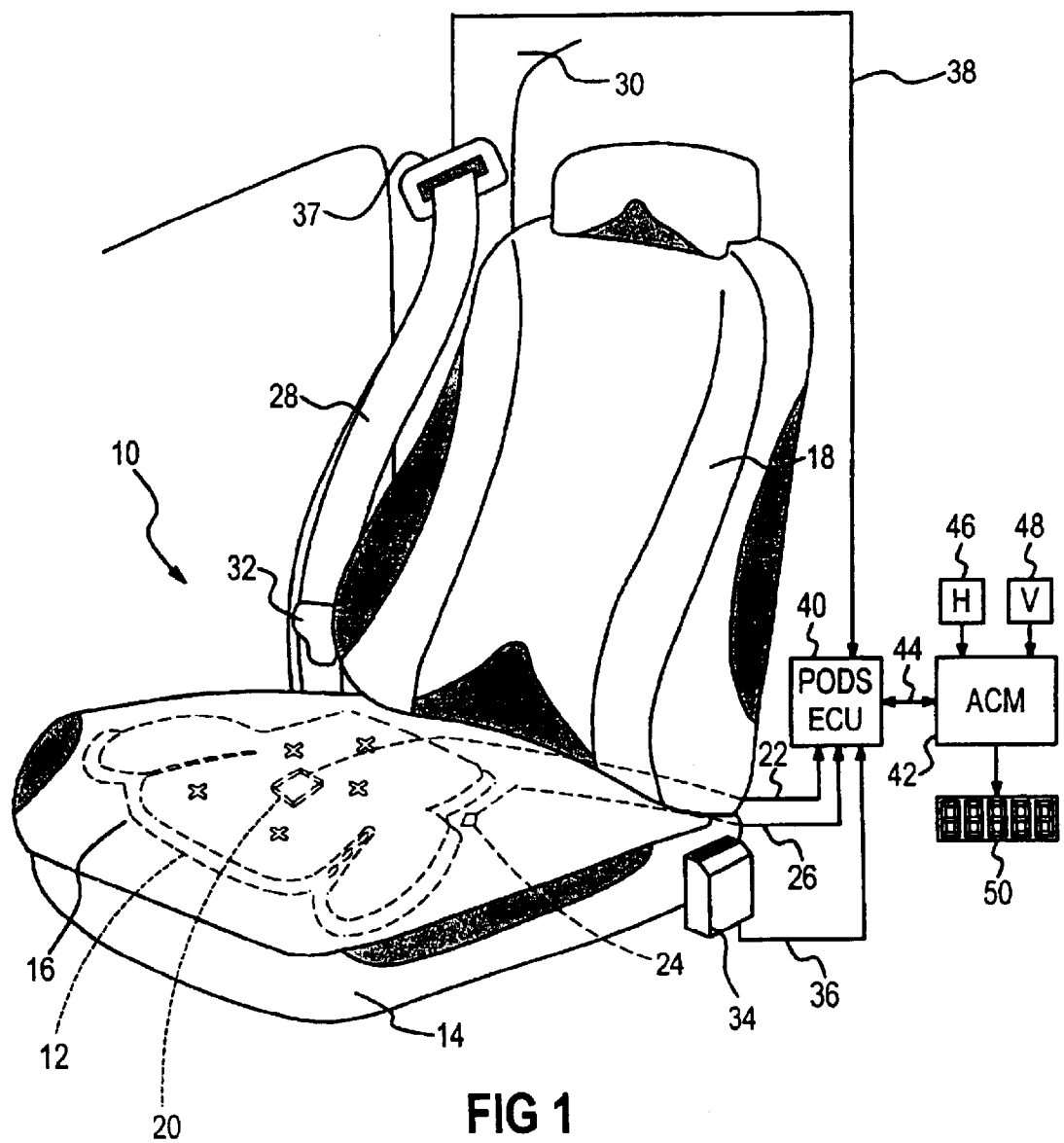
FIG. 1 is a system diagram illustrating a passenger seat of a vehicle equipped with a fluid-filled bladder, a passenger occupant detection electronic control unit (PODS ECU), an airbag control module (ACM), and vehicle acceleration sensors for characterizing an occupant of the seat according to this invention.

Referring to FIG. 1, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, a semi-rigid back-plate may be placed under the bladder 12 to provide a suitable reaction surface, as disclosed for example in the U.S. patent application Ser. No. 09/311,576, filed May 14, 1999, assigned to the assignee of the present invention, and incorporated herein by reference. Alternatively, the bladder 12 may be placed between two semi-rigid back-plates to provide reaction surfaces on both sides of the bladder.

The bladder 12 is coupled to a pressure sensor 20, which provides an electrical output signal on line 22 indicative of the fluid pressure in the bladder 12. A temperature sensor 24 located in proximity to the bladder 12 provides an electrical output signal on line 26 indicative of the bladder and foam temperature. The sensor 24 can be provided as a separate sensor as indicated in FIG. 1, or may be integrated with the pressure sensor 20.

As also shown in FIG. 1, the seat 10 is equipped with a conventional shoulder/lap seat belt 28 anchored to the vehicle floor (not shown) and B-pillar 30. In use, the belt 28 is drawn around an occupant or through the frame of a child or infant seat, and a clip 32 slidably mounted on the belt 28 is inserted into the buckle 34 to fasten the belt 28 in place. A retractor assembly (not shown) mounted in the B-pillar 30 maintains a desired tension on the belt 28, and locks the belt 28 in place when the vehicle experiences significant deceleration. A sensor (not shown) within the buckle 34 detects insertion of the clip 32, and provides an electrical signal on line 36 indicative of the seat belt latch status (i.e., buckled or unbuckled). Additionally, a belt tension sensor 37 detects the tension applied to seat belt 28, and provides an electrical signal (BTS) indicative of the tension magnitude on line 38. The tension sensor 37 may be located in the B-pillar 30 as shown, near the floor on the outboard side of seat 10, or in any other convenient location, and may be constructed as disclosed, for example, in Research Disclosure No. 41402, October, 1998, Page 1304, incorporated herein by reference.

The electrical pressure, temperature, seat belt latch status and seat belt tension signals on lines 22, 26, 36 and 38 are provided as inputs to a passenger occupant detection system electronic control unit (PODS ECU) 40, which in turn, is coupled to an airbag control module (ACM) 42 via bi-directional communication bus 44. The ACM 42 may be conventional in nature, and operates to deploy one or more airbags or other restraint devices (not shown) for vehicle occupant protection based on the vertical and/or horizontal acceleration signals obtained from vertical acceleration sensor (V) 48 and horizontal acceleration sensor (H) 46, and occupant characterization data obtained from PODS ECU 40. In general, ACM 42 deploys the restraints if the acceleration signals indicate the occurrence of a severe crash, unless the PODS ECU 40 indicates that deployment should be suppressed. Of course, other more sophisticated controls are also possible, such as controlling the deployment force of the restraint devices based on the occupant characterization data provided by PODS ECU 40. Also, ACM 42 communicates the suppression status to a driver display device 50 to enable the driver to verify that the system has properly characterized the seat occupant.

In the illustrated embodiment, the primary function of PODS ECU 40 is to estimate occupant weight based on the various input signals mentioned above, and to determine whether deployment of the inflatable restraints should be allowed or suppressed. The relationship between occupant weight and the output of pressure sensor 20 can be empirically determined or calibrated in a factory setting by placing a known weight on the seat 10 under a given set of environmental conditions. However, it is known that in actual vehicle usage, the sensed pressure for a given seat occupant will vary to some extent even under static conditions due to differences in temperature, humidity, seat belt tension, and seat covering tension. Of course, vehicle movement and occupant movement can cause significant variation of the sensed pressure. Thus, it is difficult to accurately distinguish a child occupant from a small adult occupant under all circumstances by simply comparing the sensed pressure to a fixed threshold. Accordingly, an important aspect of the present invention involves identifying major factors influencing the sensed pressure, and using such factors to adjust the threshold in a direction that minimizes the overall system variability. In the illustrated embodiment, the major factors that can be identified include the mass of the occupant, the seat belt tension and the cushion temperature. For example, if the seat belt tension (as measured by the sensor 37) is relatively high, the sensed pressure will be skewed higher than would otherwise be expected, and the pressure threshold is adjusted upward in relation to the measured tension to minimize variability of the occupant status determination due to higher-than-normal seat belt tension. Likewise, if the cushion temperature (as measured by sensor 24) is colder than normal, the output pressure will be skewed lower than would ordinarily be expected, and the pressure threshold is adjusted downward in relation to the amount by which the measured temperature deviates from a normal range of temperatures. And finally, the pressure threshold is adjusted upward when the occupant free mass is estimated to be relatively low, and downward when the occupant free mass is estimated to be relatively high; this also minimizes variability by increasing the likelihood that deployment will be allowed for an adult (high free mass) occupant, and suppressed for a child (low free mass) occupant.

According to another aspect of this invention, the free mass of the seat occupant is estimated by considering the variation of the pressure signal output (that is, $\Delta PS$) with respect to variations in acceleration measured by vertical acceleration sensor 48. Considering the above-mentioned factors that affect the pressure sensor output signal variability, the overall variability ($\Delta PS$) may be considered as the sum of several components, as follows:

$$\Delta PS = \Delta PSzero + \Delta PSsb + \Delta PSfm + \Delta PSenv + \Delta PSom \quad (1)$$

where $\Delta PSzero$ is the variation in the pressure signal that occurs even when the seat 10 is empty due to seat cover tension and so forth, $\Delta PSsb$ is the variation in the pressure signal due to seat belt tension, $\Delta PSfm$ is the variation in the pressure signal due to the effects of vehicle movement on the occupant free mass, $\Delta PSenv$ is the variation in the pressure signal due to environmental conditions such as temperature and humidity, and $\Delta PSom$ is the variation in the pressure signal due to occupant movement. Since the components $\Delta PSzero$, $\Delta PSsb$ and $\Delta PSenv$ are relatively constant for at least short time intervals, $\Delta PS$ may be considered as the sum of $\Delta PSfm$ and $\Delta PSom$ over a suitably short interval. Also, the component $\Delta PSom$ can be minimized by ignoring (filtering) substantial excursions of the output signal, since occupant movement typically results in output signal shifts that are much higher than signal shifts due to vertical acceleration of the vehicle. With these assumptions, the overall variability in the pressure sensor output ($\Delta PS$) may be expressed as:

$$\Delta PS = \Delta PSfm = \Delta ACCEL*(MASSc/b + MASSf) \quad (2)$$

where $\Delta ACCEL$ is the change in vertical acceleration of the vehicle, $MASSc/b$ is the combined mass of the cushion 16 and bladder 12, and $MASSf$ is the free mass of the seat occupant. Thus, the combined free mass (FREE_MASS) of the occupant, the cushion 16 and the bladder 12 may be estimated as:

$$FREE\_MASS = K(\Delta PS/\Delta ACCEL) \quad (3)$$

where K is a constant, and MASSf may be estimated as:

$$MASSf = K(\Delta PS/\Delta ACCEL) - MASSc/b \quad (4)$$

Figure 2:
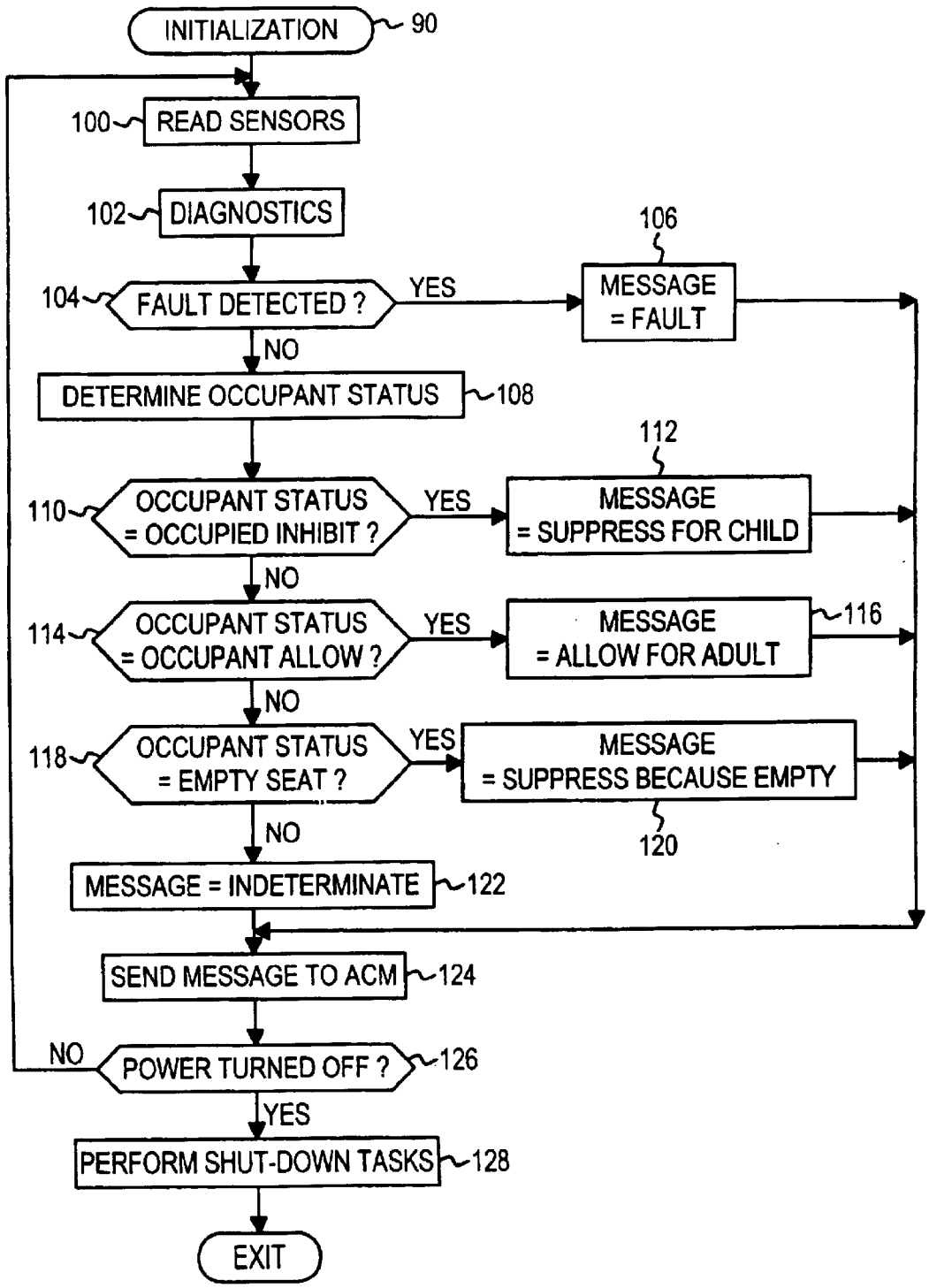
FIGS. 2, 3 and 4 depict a flow diagram representative of a software routine executed by the PODS ECU of FIG. 1 in carrying out the method of this invention.
Figure 3:
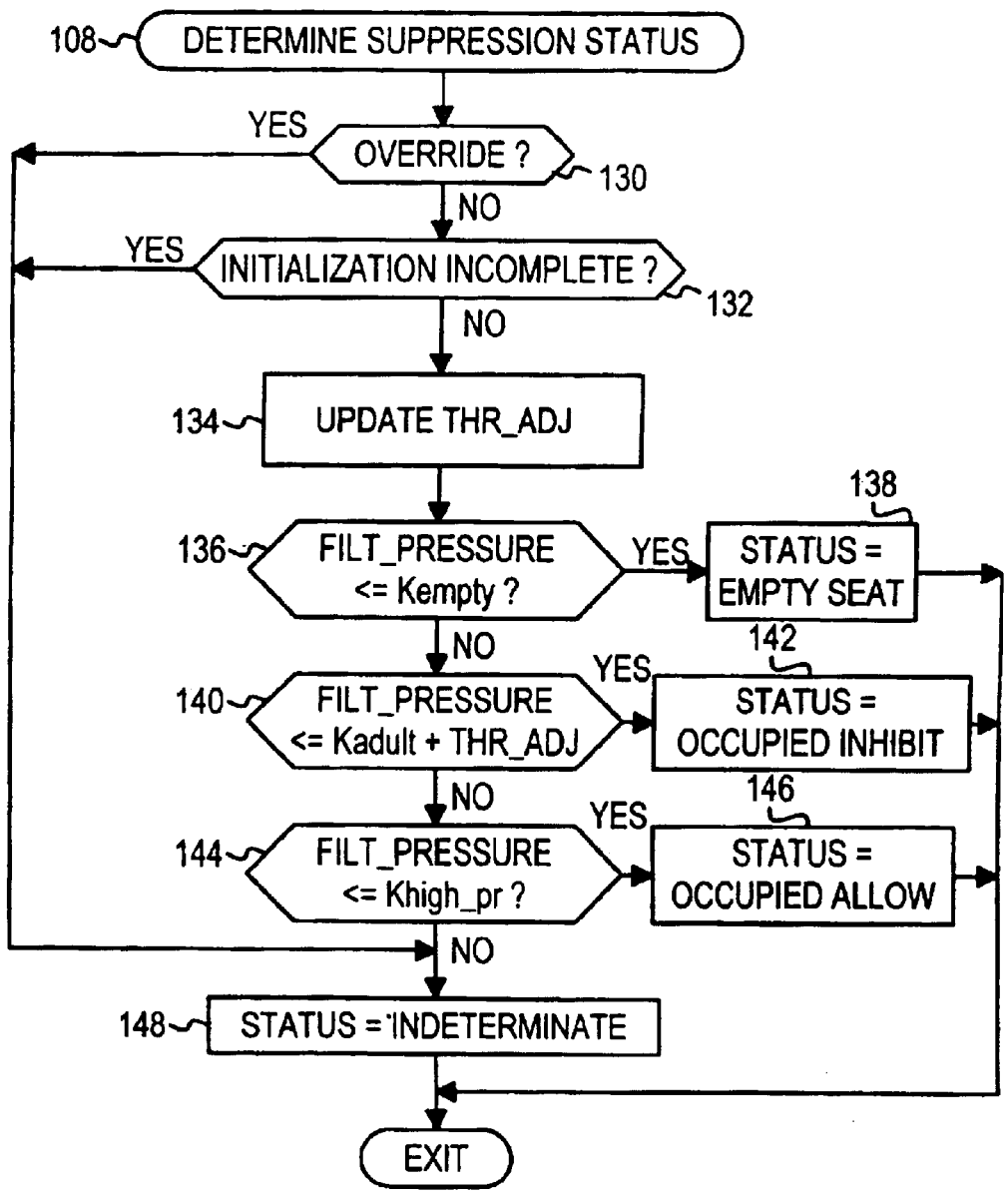
Figure 4:
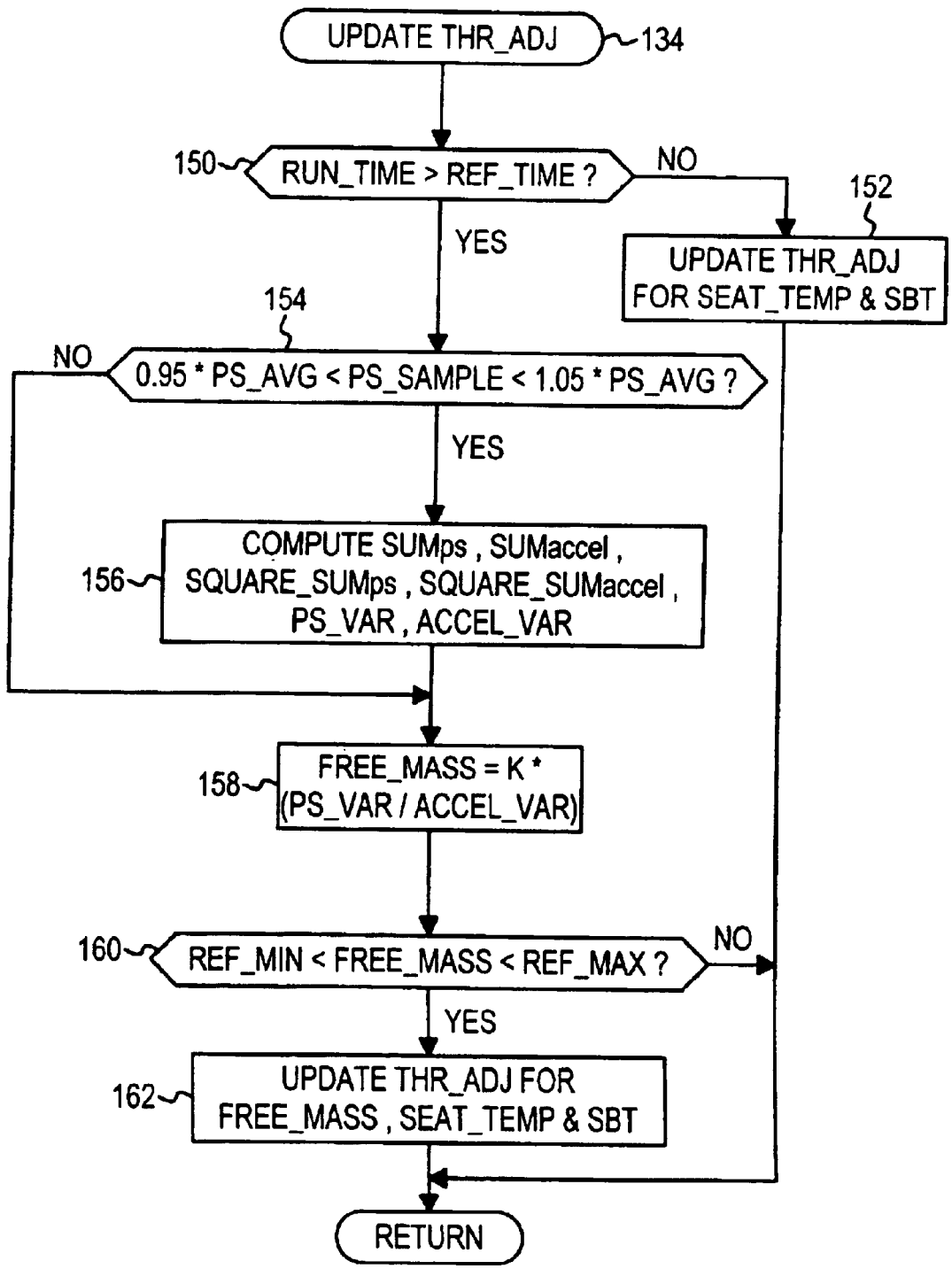

The flow diagrams of FIGS. 2–4 illustrate a software routine periodically executed by the PODS ECU 40 for carrying out the above-described method. The flow diagram of FIG. 2 represents a main or executive routine, whereas the flow diagrams of FIGS. 3–4 detail occupant status determination. At the initiation of each period of vehicle operation, the PODS ECU 40 executes an initialization routine as indicated by block 90 of FIG. 2 for initializing various registers, parameters and flags to zero or some other default setting. In the case of this invention, for example, the suppression status (STATUS) may be initialized to a default setting, or to a setting determined in the previous ignition cycle, and the threshold adjustment THR_ADJ may be initialized to zero. A similar initialization also occurs in the event of a dynamic reset. Following initialization, the blocks 100–126 are repeatedly executed as shown. The blocks 100 and 102 read all of the sensor information mentioned above in reference to FIG. 1 and perform diagnostic testing of the system and components. If the diagnostic testing detects a fault, the block 104 is answered in the affirmative, and the block 106 sets the status message to FAULT. Otherwise, the block 18 is executed to determine occupant status as detailed in the flow diagrams of FIGS. 3 and 4. If the occupant status is OCCUPIED INHIBIT, as determined at block 110, the block 112 sets the status message to SUPPRESS FOR CHILD. If the occupant status is OCCUPANT ALLOW, as determined at block 114, the block 116 sets the status message to ALLOW FOR ADULT. And if the occupant status is EMPTY SEAT, as determined at block 118, the block 120 sets the status message to SUPPRESS BECAUSE EMPTY. If blocks 110, 114, and 118 are answered in the negative, the block 122 sets the status message to INDE- TERMINATE. The block 124 then sends the determined occupant status message to ACM 42, and the block 126 checks for removal of system power. When system power is removed, the block 128 is executed to perform shut-down tasks, and the routine is exited.

Referring to FIG. 3, determining the suppression status generally involves comparing a filtered version of the pressure sensor output (FILT_PRESSURE) to various thresholds. Initially, the blocks 130 and 132 are executed to determine if there has been a driver-override of the occupant sensing system or if system initialization has not been completed. In either case, the block 148 is executed to set STATUS to INDETERMINATE, and the routine is exited. Usually, however, blocks 130 and 132 will be answered in the negative, and the block 134 is executed to update the threshold adjustment THR_ADJ based on estimated occupant free mass, seat belt tension SBT and seat temperature SEAT_TEMP, as detailed in the flow diagram of FIG. 4. If FILT_PRESSURE is less than or equal to a predetermined low threshold Kempty indicative of an unoccupied seat, the blocks 136 and 138 detect the condition and set STATUS to EMPTY, completing the routine. If FILT_PRESSURE is greater than Kempty, block 140 compares FILT_PRESSURE to an adjustable threshold defined by the sum (Kadult+THR_ADJ), where Kadult is a default value of the adjustable threshold, and indicative of large child occupant (that is, an occupant slightly smaller than a $5^{th}$ percentile adult female, for example). The term THR_ADJ is determined at block 134 as mentioned above, and may be either positive or negative in sign to increase or decrease the value of the sum (Kadult+THR_ADJ). If block 140 is answered in the affirmative, the occupant is considered to be a child for whom deployment of the restraints should be suppressed, and block 142 is executed to set STATUS to OCCUPIED INHIBIT. If FILT_PRESSURE exceeds the sum (Kadult+THR_ADJ) and is less than an unrealistically high threshold Khigh_pr, as determined at block 144, the occupant is considered to be an adult for whom deployment of the restraints should be allowed, and block 146 is executed to set STATUS to OCCUPIED ALLOW. If FILT_PRESSURE exceeds Khigh_pr, a reliable indication of occupant position cannot be obtained, and the block 148 is executed to set STATUS to INDETERMINATE. Although not shown, the routine will preferably include a degree of hysteresis to prevent STATUS from toggling between two different states; once STATUS stabilizes in a given state, the hysteresis values can be increased to reduce sensitivity to road noise, occupant movement, and so on.

Referring to FIG. 4, updating the threshold adjustment THR_ADJ initially involves determining if RUN_TIME (that is, the time elapsed during the current driving cycle) exceeds a reference time REF_TIME, such as two minutes. If block 150 is answered in the negative, the vehicle is considered to be primarily stationary; in this case, dynamic variation of the pressure signal PS is significantly influenced by occupant movement, seat adjustment, etc., and the block 152 is executed to update THR_ADJ based on SEAT_TEMP and seat belt tension SBT. As indicated above, THR_ADJ is increased in relation to SBT if SBT is higher than would ordinarily be expected, since such tension has the effect of skewing PS higher than would occur with normal seat belt tension. In this case, increasing THR_ADJ increases the sum (Kadult+THR_ADJ), which proportionately increases the likelihood that the occupant will be characterized as a child (i.e., that STATUS will be set to OCCUPIED INHIBIT). Similarly, THR_ADJ is decreased (adjusted in the negative direction) in relation to the deviation of SEAT_TEMP below a normal range of temperatures, since the cold temperature has the effect of skewing PS lower than would occur in the normal temperature range. In this case, decreasing THR_ADJ decreases the sum (Kadult+THR_ADJ), which proportionately increases the likelihood that the occupant will be characterized as an adult (i.e., that STATUS will be set to OCCUPIED ALLOW).

Once RUN_TIME exceeds REF_TIME, the blocks 154, 156, 158 and 160 are executed to identify the free mass FREE_MASS of the occupant based on a detected variation of the sensed pressure PS with respect to variation of the measured vertical acceleration ACCEL. The block 154 determines if the pressure signal value PS_SAMPLE determined at block 100 is within a predetermined percentage (5% in the illustrated embodiment) of a running average PS_AVG of the pressure signal. If not, the unusually high or low value of PS_SAMPLE is considered due to occupant movement, and is ignored for purposes of estimating the occupant free mass. However, if block 154 is answered in the affirmative, the block 156 is executed to update the acceleration variance ACCEL_VAR, and to use PS_SAMPLE to update the pressure signal variance PS_VAR. This involves summing filtered values of the pressure sensor output signal PS and the vertical acceleration sensor output signal ACCEL, and calculating a sum of squares SQUARE_SUM$_{ps}$, SQUARE_SUM$_{accel}$ for each of the signals, as follows:

$$\text{SQUARE\_SUM}_{ps} = [\text{SQUARE\_SUM}_{ps} + PS_f^2]/REF1 \qquad (5)$$

$$\text{SQUARE\_SUM}_{accel} = [\text{SQUARE\_SUM}_{accel} + ACCEL_f^2]/\text{SAMPLES} \qquad (6)$$

where SUM$_{ps}$, is the summation of the pressure signal values, SUM$_{accel}$ is the summation of the acceleration signal values, SAMPLES is the number of summed values, and the subscript f indicates a filtered value. Then, the variance PS_VAR of the pressure sensor signal and the variance ACCEL_VAR of the acceleration sensor signal are calculated as follows:

$$PS\_VAR = \text{SQUARE\_SUM}_{ps} - (\text{SUM}_{ps}/\text{SAMPLES})^2 \qquad (7)$$

$$ACCEL\_VAR = \text{SQUARE\_SUM}_{accel} - \text{SUM}_{accel}/\text{SAMPLES})^2 \qquad (8)$$

The block 158 then estimates the combined free mass FREE_MASS of the occupant, cushion 16 and bladder 12 according to the ratio PS_VAR/ACCEL_VAR, using equation (3) above. As a practical matter, the execution of block 158 should be skipped if ACCEL_VAR is a very low value in order to avoid dividing by a small number, and also since the free mass estimate will be less reliable. So long as FREE_MASS is within a normal range of values determined by the reference values REF_MIN and REF_MAX, the block 160 will be answered in the affirmative, and block 162 will be executed to update THR_ADJ based on FREE_MASS, SEAT_TEMP and seat belt tension SBT. As indicated above, THR_ADJ is adjusted upward in relation to the amount by which FREE_MASS is below a range of values that ordinarily occur with a small adult, and downward in relation to the amount by which FREE_MASS is above such range of values. This has the effect of minimizing system variability by increasing the likelihood that that STATUS will be set to OCCUPIED ALLOW for an adult (high free mass) occupant, and that STATUS will be set to OCCUPIED INHIBIT for a child (low free mass) occupant.

In summary, the method of this invention provides a simple and effective way of utilizing both static and dynamic occupant weight-responsive data in a complementary fashion to more reliably determine if deployment of inflatable restraints should be allowed or suppressed. The static data is compared to a threshold for purposes of determining if deployment should be allowed or suppressed, and dynamic information is utilized along with vehicle acceleration information to estimate the free mass of the occupant for the purpose of adjusting the threshold in a direction to minimize variability of the allow/suppress decision due to environmental and other factors. The threshold is also adjusted for other factors that can be specifically identified, including seat belt tension and seat cushion temperature. While illustrated in reference to the illustrated embodiment, it is expected that various modifications will occur to persons skilled in the art. For example, this invention is not limited to pressure based bladder systems, and may be applied equally as well to other occupant weight sensing systems, as indicated above. Accordingly, it should be understood that occupant characterization methods incorporating these and other modifications may fall within the scope of this invention, which is defined by the appended claims.

What is claimed is:

1. A method of determining whether to allow or suppress deployment of a vehicular inflatable restraint for a vehicle occupant based at least in part on an output signal of a sensor responsive to occupant weight applied to a vehicle seat, the method comprising the steps of:

comparing a filtered version of said output signal to a threshold having a default value corresponding to a predetermined occupant weight under a given set of conditions;

measuring a vertical acceleration of the vehicle;

sampling output signal values and computing an average of the sampled values;

identifying sampled output signal values that are within a specified percentage of said average;

computing a first variance of the identified output signal values;

computing a second variance of the measured vertical acceleration;

determining a free mass of the vehicle occupant according to a ratio of the first variance and the second variance;

establishing a predetermined range of free mass values corresponding to an average weight occupant;

adjusting said threshold below said default value when the determined value of said free mass is above a the predetermined range of free mass values;

adjusting said threshold above said default value when the determined value of said free mass is below the predetermined range of free mass values;

maintaining a current value of said threshold when said free mass is within said predetermined range of free mass values; and allowing deployment of said restraint when the filtered version of said output signal is above said threshold, and suppressing deployment of said restraint when the filtered version of said output signal is below said threshold.

2. The method of claim 1, including the steps of:

measuring a vehicle run time; and delaying the step of determining the value of said free mass until the measured run time reaches a predetermined threshold.

3. The method of claim 1, wherein said vehicle seat is equipped with a seat belt for restraining said occupant, the method including the steps of:

measuring the tension of said seat belt; and adjusting said threshold above said default value when the measured tension is above a predetermined normal range.

4. The method of claim 1, including the steps of:

measuring a temperature of the vehicle seat; and adjusting said threshold below said default value when the measured temperature is below a predetermined normal range.

* * * * *